Sept. 29, 1953 G. A. SWARTZ 2,653,646
CRIMPING APPARATUS
Filed May 1, 1951 4 Sheets-Sheet 3
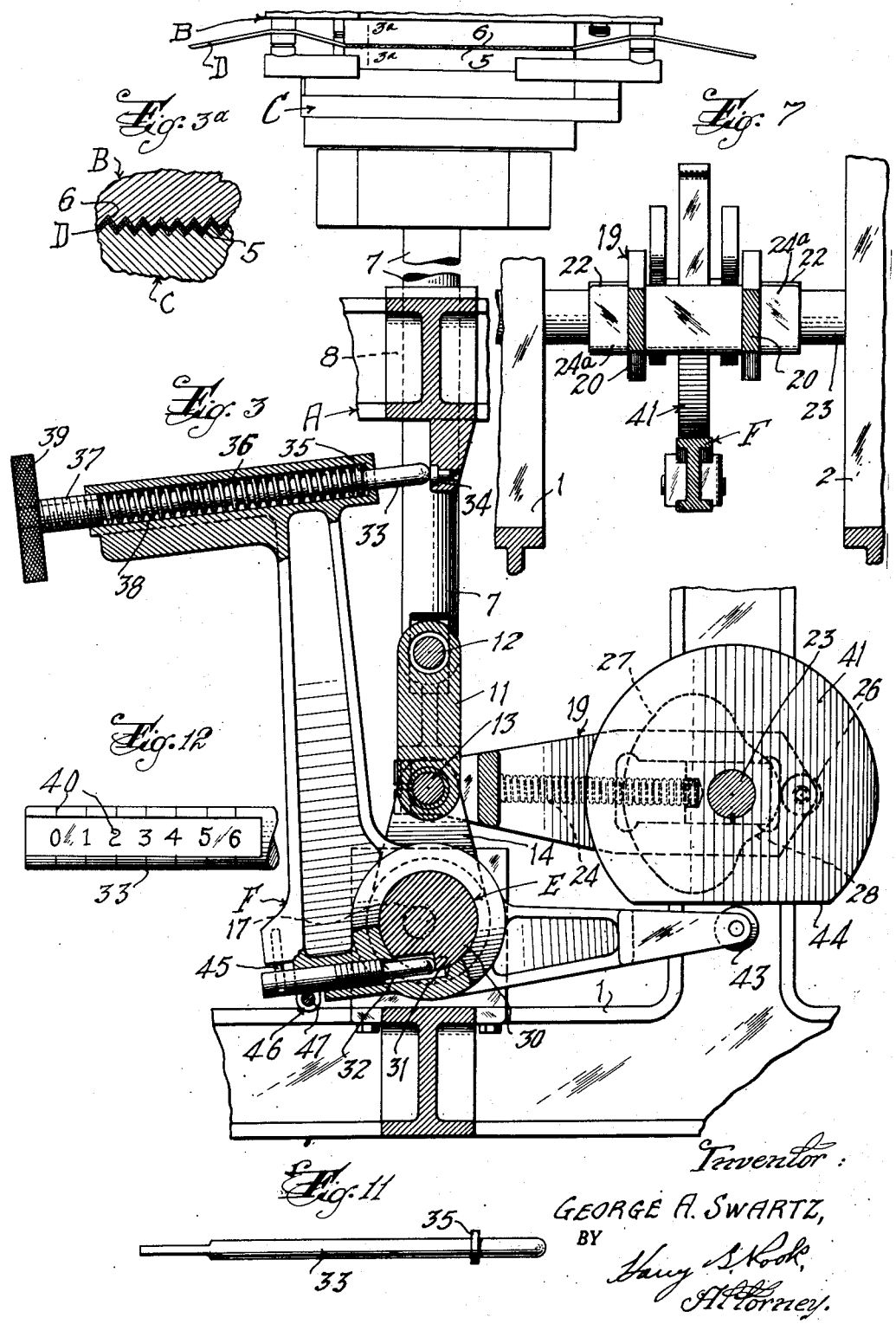
Inventor:
GEORGE A. SWARTZ,
BY Sept. 29, 1953 G. A. SWARTZ 2,653,646
CRIMPING APPARATUS
Filed May 1, 1951 4 Sheets-Sheet 4
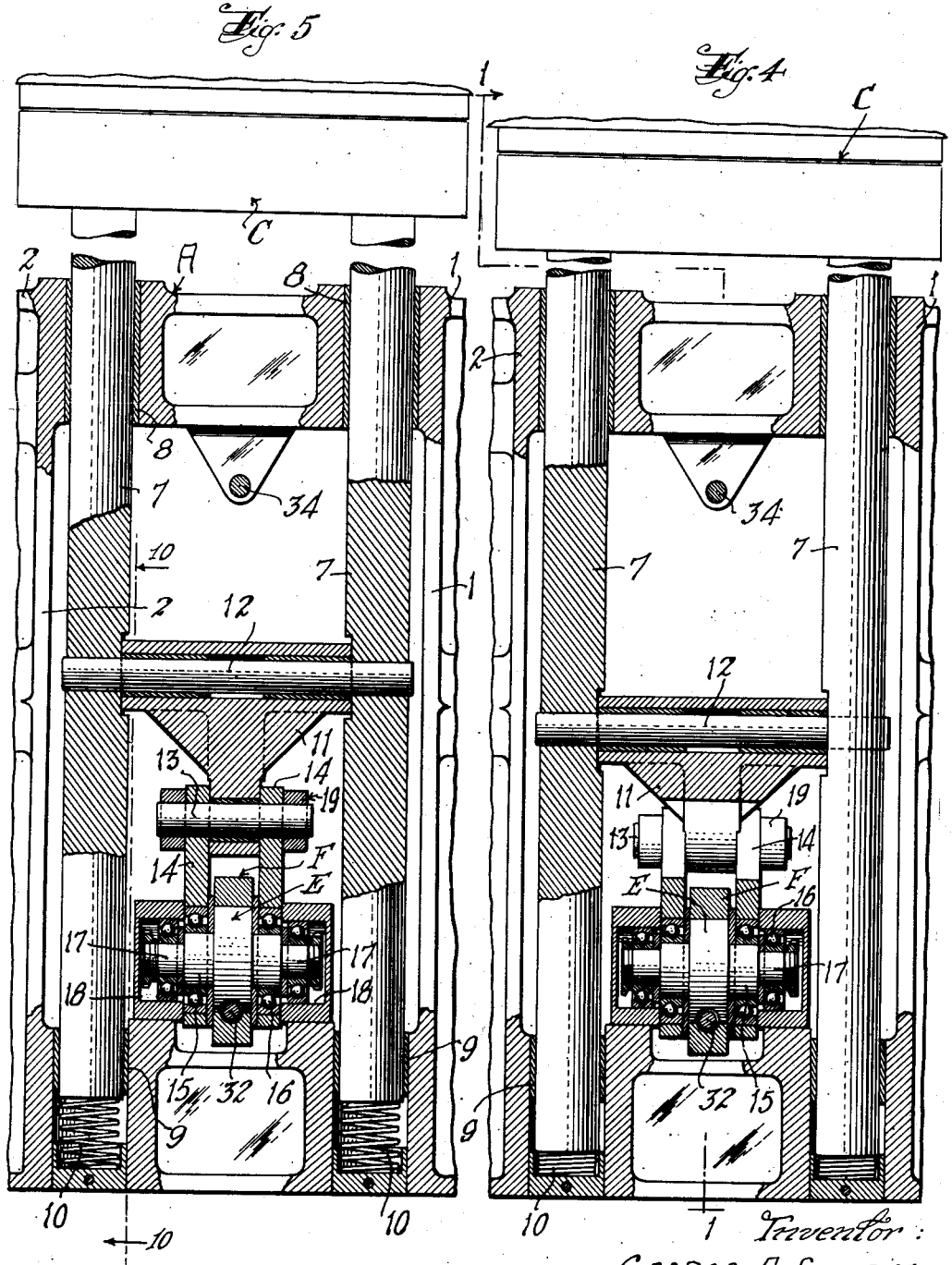
Inventor:
GEORGE A. SWARTZ,
BY Patented Sept. 29, 1953

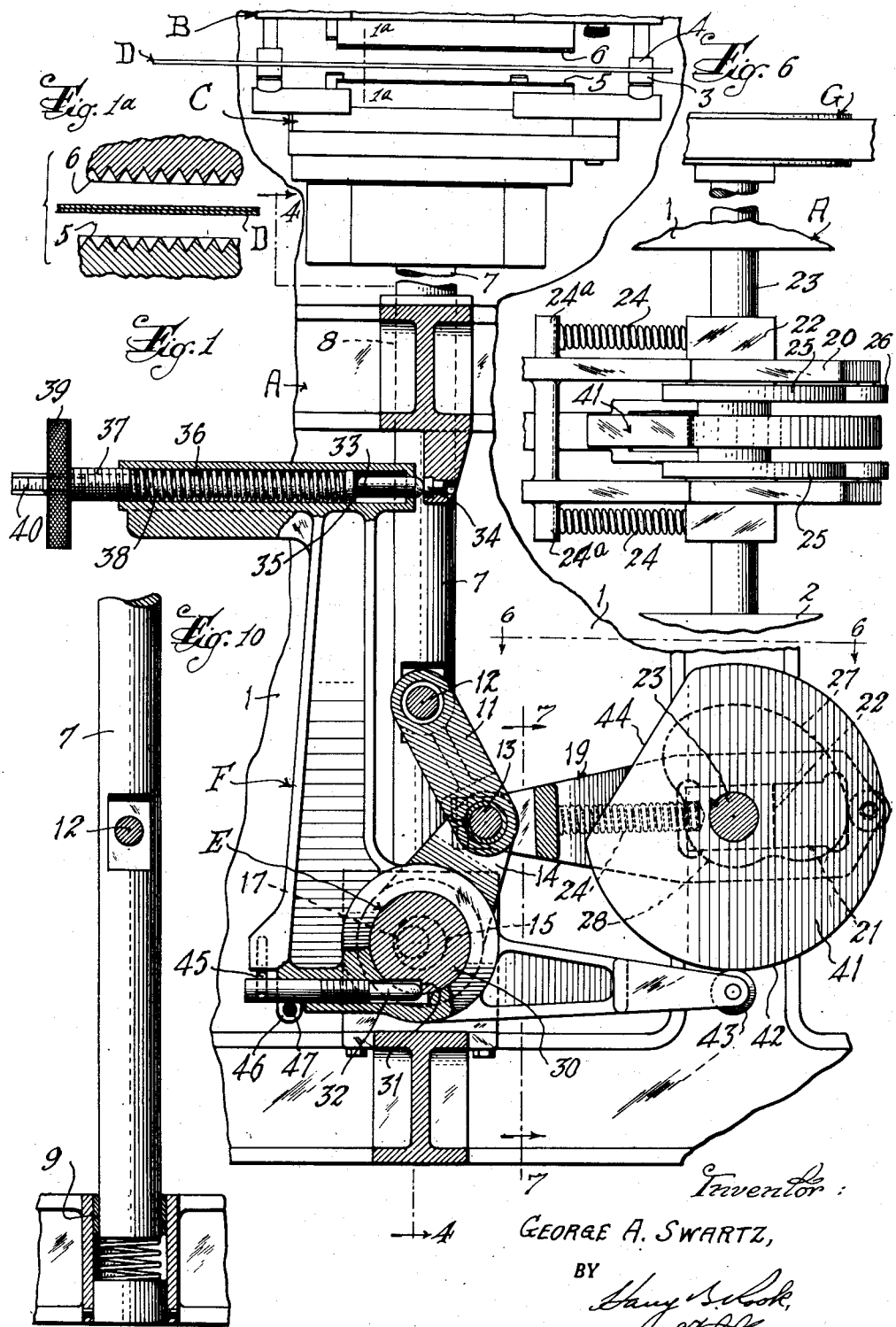

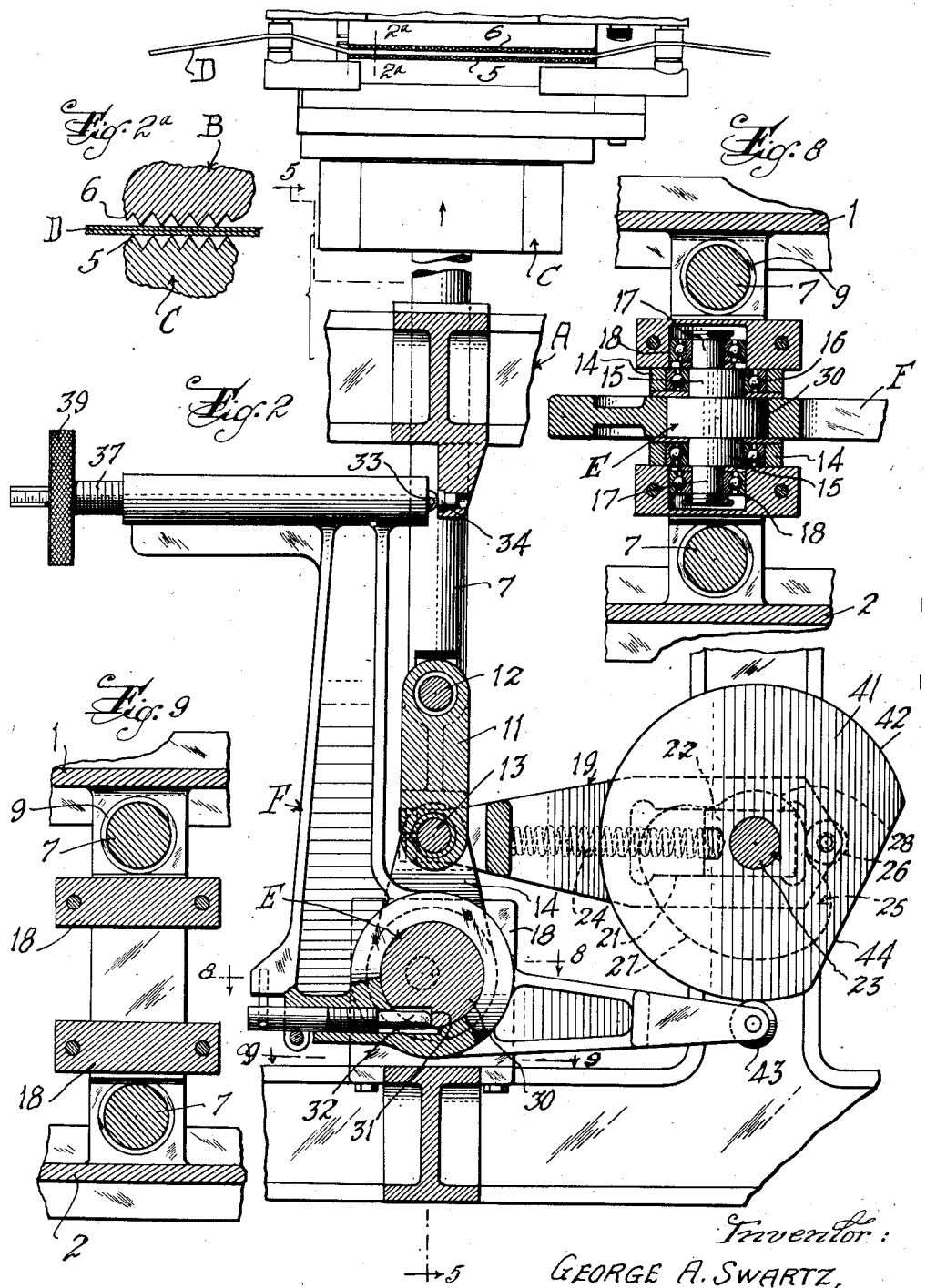

2,653,646

UNITED STATES PATENT OFFICE 2,653,646

CRIMPING APPARATUS

George A. Swartz, Millington, N. J., assignor to Ivers-Lee Company, Newark, N. J., a corporation of Delaware Application May 1, 1951, Serial No. 223,921

9 Claims. (Cl. 154—42)

This invention relates in particular to a machine for sealing together layers of packaging material for making or closing packages or for attaching labels or covers to the packages, although the invention is susceptible of use wherever it is desired to press one or more layers of material into tight contact with another. More specifically the invention contemplates a machine wherein a movable die or jaw is actuated first through a primary step of movement toward another die or jaw under relatively low pressure and then through a secondary step of movement in the same direction under high pressure to clamp, crimp or seal together layers of material between the dies or jaws.

One object of the invention is to provide such a machine which shall include a novel and improved means for selectively varying the force under which the movable die is actuated through said secondary movement into clamping relation to the other die.

Another object is to provide a machine of the general character described which shall embody a novel and improved construction including two mechanisms one of which actuates the movable die or jaw rapidly into close proximity to the other die or jaw while the second mechanism cooperates with a portion of the first-mentioned mechanism and includes a spring and means for storing energy therein to continue the actuation of the movable die in said direction into material-clamping or crimping relation to the other die or jaw.

Further objects are to provide actuating means for the movable die or jaw which shall include a toggle, means for actuating the toggle to actuate the movable die toward and from operative relation to the other die, and mechanism for causing through said toggle a secondary movement of the movable die into crimping relation to the other die; and to provide novel and improved means for permitting said secondary movement of the movable die selectively under different pressures or forces.

Still another object is to provide die operating mechanism of the character described wherein said secondary movement of the movable die is effected by a spring in which energy is stored during straightening of the toggle to initiate the movement of the movable die toward the other die and thereafter said energy is applied by said spring to said straightened toggle to complete the movement of said movable die into clamping relation to the other die.

Other objects, advantages and results of the invention will be brought out by the following description in conjunction with the accompanying drawings in which:

Figure 1 is a fragmentary combined side elevational view and vertical longitudinal sectional view approximately on the plane of the line 1—1 of Figure 4, showing the movable die in spaced relation to the fixed die;

Figure 1a is a fragmentary enlarged vertical section view through portions of the movable and fixed dies and layers of material between them, approximately on the plane of the line 1a—1a of Figure 1;

Figure 2 is a view similar to Figure 1 showing the movable die at the end of its initial movement into close proximity to the fixed die;

Figure 2a is a view similar to Figure 1 approximately on the plane of the line 2a—2a of Figure 2;

Figure 3 is a view like Figure 2 showing the secondary movement of the movable die;

Figure 3a is a view similar to Figure 1a taken approximately on the plane of the line 3a—3a of Figure 3;

Figure 4 is a combined front elevational view and vertical sectional view approximately on the plane of the line 4—4 of Figure 1;

Figure 5 is a similar view approximately on the plane of the line 5—5 of Figure 2;

Figure 6 is a fragmentary plan view approximately on the plane of the line 6—6 of Figure 1;

Figure 7 is a vertical sectional view approximately on the plane of the line 7—7 of Figure 1;

Figure 8 is a horizontal, sectional view approximately on the plane of the line 8—8 of Figure 2;

Figure 9 is a horizontal sectional view approximately on the plane of the line 9—9 of Figure 2;

Figure 10 is a fragmentary vertical sectional view approximately on the plane of the line 10—10 of Figure 5;

Figure 11 is a detached plan view of the spring actuated plunger shown in Figure 1; and Figure 12 is a greatly enlarged fragmentary side elevational view of one end of said rod showing the graduations thereon.

The apparatus embodying the invention for closing the dies or jaws, that is, for example, for moving a lower die toward and from an upper fixed die, generally will be associated in the same machine frame with means for supplying the strips or layers of material to be pressed or sealed together, means for severing the layers after the pressing or sealing thereof and motor drive mechanism; and in the accompanying drawings the reference character A designates such machine frame that is shown as including two spaced side pieces 1 and 2 between which is mounted an upper die B of suitable construction with which cooperates a lower die C that is vertically movable toward and from the upper die B to press or crimp seal together two layers of for example flexible packaging material D such as rubber hydrochloride, "cellophane" or metal foil. The material D may or may not be heat sealable, but where it is heat sealable, one or both of the dies will be electrically heated in known manner. The lower die may have fixed stripper bars 3 cooperating with gravitationally and vertically slidable stripper bars 4 on the upper die to receive the strips D and to remove them from contact with the die faces 5 and 6 respectively as the dies are moved apart.

The lower die C is shown as mounted on vertical support-guide rods 7 which are vertically slidably mounted in bearings 8 and 9 in the frame, and a portion of the weight of the die is counterbalanced by springs 10 beneath the support-guide rods 7.

In accordance with the invention the lower die is initially moved from its lowermost position shown in Figures 1 and 1a to bring its face 5 into close proximity to the face 6 of the upper die as schematically illustrated in Figures 2 and 2a, whereupon the die is given a secondary movement under substantially a higher force or pressure to move its face 5 into material crimping relation to the face 6 of the upper die as schematically shown in Figures 3 and 3a; and the force or a pressure applied to the die during said secondary movement is selectively variable.

For so actuating the lower die, one link 11 of a toggle is pivotally connected at one end to a shaft 12 to and between the support-guide rods 7 and the other end of said link is pivotally connected by a pin 13 to and between two sections 14 of another toggle link which are rotatably mounted as by ball bearings 16 on coaxial portions 15 of a stub shaft E that is eccentrically mounted by end trunnions 17 in bearings 18 on the frame A.

A cam follower strap 19 comprises two spaced parallel sections 20 each of which has a slot 21 in which is slidably fitted a guide block 22 on a shaft 23 so that the cam follower strap is slidable longitudinally on said block 22. One end of the cam strap is pivotally connected to the pin 13 and compression springs 24 are interposed between the respective blocks 22 and abutment lugs 24a on the cam follower strap for sliding said strap in one direction (to the left in Figure 1) so as to move the toggle links into dead center relation to each other, that is, to straighten the toggle. For moving the strap in the other direction to break the toggle and for locking the toggle in straight condition, cams 25, one for each of the sections 20 of the cam follower strap are mounted on the drive shaft and cooperate with follower rollers 26 on said sections 20, each cam having two concentric cam surfaces 27 and 28 of different radii. The shaft 23 may be driven from any suitable source of power such as a belt and pulley G and may be controlled by a clutch or otherwise. The larger cam surfaces 27 actuate the cam follower strap in the direction to break the toggle (to the right in Figure 2) as shown in Figure 1, while the smaller cam surface 28 serves in cooperation with the springs 24 to lock the toggle in straight condition with the links in dead center relation to each other as shown in Figures 2 and 3.

From the foregoing, it will be seen that the toggle, cam follower strap, springs 24 and cams 25 serve to actuate the lower die through its initial or primary movement, the die being moved from its lowermost position of Figure 1 by the springs 24 acting on the toggle under control of the follower rollers 26 on the cam surfaces 27 until the die face 5 is in close proximity to the face 6 of the upper die as shown in Figures 2 and 2a. If desired the cams 25 could be box cams and positively actuate the toggles in both directions so as not to rely on the springs 24.

Thereupon the lower die is actuated by means about to be described through its secondary movement to complete the sealing or crimping operation. As shown, a bell crank lever F is mounted on an enlarged hub portion 30 of the stub shaft E which is coaxial with the toggle mounting portions 15 but eccentric to the trunnions 17; and said hub portion has a shoulder 31 in its periphery normally abutted by one end of an abutment element 32 that is mounted in the bell crank lever so that the shaft 30 will be constrained to rotate with the bell crank lever F in one direction. One arm of the bell crank has a presser rod 33 slidably mounted in said arm with one end abutting a lug 34 depending from a portion of the frame A. The presser rod has a collar or shoulder 35 engaged by one end of a compression spring 36 the other end of which is abutted by a tubular abutment screw 37 which is screw-threaded into a guide opening 38 in which the rod 33 and spring 36 are mounted. The rod 33 is slidable through the screw 37 and said screw has a finger piece 39 for adjusting the pressure exerted by the spring 36 on the presser rod, which may be indicated by graduations 40 on the end of the presser rod that projects beyond the screw 37.

Energy is stored in the spring 36 through compression thereof, by a cam disc 41 keyed on the shaft 23 and having a concentric peripheral portion 42 engageable with a follower roller 43 on the other arm of the bell crank lever F for compressing the spring as shown in Figures 1 and 2. This compression takes place during the initial or preliminary movement of the lower die, and at the end of said preliminary movement the bell crank lever F is released by a cam portion 44 on the disc 41 so that the energy stored in the spring 36 may swing the bell crank lever and through the abutment element 32 and shoulder 31 rotate the stub shaft E on its eccentric trunnions 17 and thereby push upwardly on the straightened toggle so as to actuate the lower die through its secondary movement to complete the sealing or crimping operation as shown in Figure 3.

It will be observed that the pressure exerted by the lower die during said secondary movement is determined by the amount of energy stored in the spring 36 which may in turn be adjusted by the screw 37 and which is many times greater than the force required to actuate the die through its preliminary movement.

With this construction, the maximum pressure is applied to the dies through only the last few thousandths of an inch of the movement of the lower die which results in economy in the use of power and insures against premature application of the full crimping pressure.

While the abutment element 32 may be fixed on the bell crank lever, it is desirable that said element be in the form of a screw threaded into the bell crank lever so that by adjustment thereof the space between the die faces 5 and 6 may be varied. The screw may have a handle pin 45 for rotating it and may be clamped in adjusted position by a split clamp 46 including a bolt 47 for tightening a clamp around the screw 32 in known manner.

While the invention has been shown and described as embodied in certain structural details, it will be understood that this is primarily for the purpose of illustrating the now preferred embodiment of the invention and that the construction of the machine may be widely modified and changed within the spirit and scope of the invention.

I claim:

1. A machine comprising relatively movable dies having faces to receive between them material to be pressed, and mechanism for closing said dies including primary means and secondary means first to relatively move said jaws into close proximity to each other under light pressure and then continue said movement under relatively high pressure respectively, said primary means including a toggle linkage and means for actuating said toggle linkage into and locking it in straight condition to relatively move said jaws into close proximity to each other, and said secondary means including a device for storing energy during said movement of the dies by said primary means and applying said energy to the straightened toggle linkage to move same longitudinally and continue said movement of the dies.

2. A machine as defined in claim 1 wherein said secondary means includes means for selectively varying the amount of said stored energy.

3. A machine as defined in claim 1 wherein said toggle linkage has one end pivoted on an eccentrically mounted rotatable shaft while the other end is connected to at least one of said dies, and said secondary means includes a fixed abutment, a lever pivoted on said shaft coaxially with said toggle linkage and having mechanism on one arm including a part to be actuated upon engagement with said abutment as said lever is swung in one direction for storing energy, power-operated means for swinging said lever in said direction to store energy and for releasing the lever to swing in the other direction under influence of the stored energy, and means for transmitting the motion of said lever in the second-mentioned direction to said shaft to rotate the same eccentrically and thereby move said straightened toggle longitudinally to continue said movement of said dies.

4. A machine as defined in claim 3 with the addition of means for selectively varying the amount of said stored energy.

5. A machine as defined in claim 3 wherein said part of said device for storing energy includes a spring.

6. A machine as defined in claim 3 wherein said mechanism comprises a presser rod slidably mounted on said lever arm with one end to abut said abutment, a spring one end of which engages said presser rod, and an adjustable abutment on said lever for the other end of said spring, whereby said spring is compressed to store energy upon movement of said lever in the first-mentioned direction and the amount of stored energy can be varied by said adjustable abutment.

7. A machine as defined in claim 3 wherein said lever is a bell crank, and said power-operated means includes a power driven cam engageable with the other arm of said bell crank.

8. A machine as defined in claim 3 wherein the last-named means includes a shoulder on said shaft and an abutment element on said lever to abut said shoulder upon movement of said lever in the second-mentioned direction.

9. A machine as defined in claim 3 wherein the last-named means includes a shoulder on said shaft and an abutment element on said lever to abut said shoulder upon movement of said lever in the second-mentioned direction, said abutment element being adjustable in said lever to vary the opening between the faces of the dies.

GEORGE A. SWARTZ.

References Cited in the file of this patent

UNITED STATES PATENTS

| Number | Name | Date |
|---|---|---|
| 2,476,629 | Salfisberg | July 19, 1949 |